US 10,452,691 B2

(12) United States Patent
Liu

(10) Patent No.: US 10,452,691 B2
(45) Date of Patent: Oct. 22, 2019

(54) METHOD AND APPARATUS FOR GENERATING SEARCH RESULTS USING INVERTED INDEX

(71) Applicant: TENCENT TECHNOLOGY (SHENZHEN) COMPANY LIMITED, Shenzhen (CN)

(72) Inventor: Xiaojun Liu, Shenzhen (CN)

(73) Assignee: TENCENT TECHNOLOGY (SHENZHEN) COMPANY LIMITED, Shenzhen (CN)

(*) Notice: Subject to any disclaimer, the term of this patent is extended or adjusted under 35 U.S.C. 154(b) by 496 days.

(21) Appl. No.: 15/166,962

(22) Filed: May 27, 2016

(65) Prior Publication Data
US 2016/0275178 A1 Sep. 22, 2016

Related U.S. Application Data

(63) Continuation of application No. PCT/CN2014/090370, filed on Nov. 5, 2014.

(30) Foreign Application Priority Data

Nov. 29, 2013 (CN) .......................... 2013 1 0631836

(51) Int. Cl.
*G06F 17/30* (2006.01)
*G06F 16/31* (2019.01)
(Continued)

(52) U.S. Cl.
CPC .......... *G06F 16/319* (2019.01); *G06F 16/334* (2019.01); *G06F 16/951* (2019.01)

(58) Field of Classification Search
CPC ......... G06F 17/30864; G06F 17/30622; G06F 17/30675; G06F 16/319; G06F 16/334; G06F 16/951
See application file for complete search history.

(56) References Cited

U.S. PATENT DOCUMENTS 5,619,709 A * 4/1997 Caid .................. G06F 16/58
715/209
5,778,361 A * 7/1998 Nanjo .................. G06F 16/319
(Continued)

FOREIGN PATENT DOCUMENTS

CN 101071442 A 11/2007
CN 101075252 A 11/2007
(Continued)

OTHER PUBLICATIONS

The State Intellectual Property Office of the People's Republic of China (SIPO) office Action 1 for 201310631836.7 dated Jul. 4, 2018 8 Pages (including translation).
(Continued)

*Primary Examiner* — Miranda Le
(74) *Attorney, Agent, or Firm* — Anova Law Group, PLLC

(57) ABSTRACT

Methods and apparatuses for search are provided and related to the field of search technology. A method may include: performing term segmentation for grabbed documents to count a term frequency of each term, the term frequency of the term representing a number of the grabbed documents containing the term; generating a high frequency term inverted index and a low frequency term inverted index respectively, wherein the high frequency term inverted index contains terms having a term frequency higher than a predefined threshold, and the low frequency term inverted index contains terms having a term frequency not higher than the predefined threshold; and loading the high frequency term inverted index and the low frequency term inverted index respectively to different retrieval modules, the different retrieval modules respectively corresponding to mutually independent storage devices.

4 Claims, 5 Drawing Sheets

(51) Int. Cl.
*G06F 16/33* (2019.01)
*G06F 16/951* (2019.01)

(56) References Cited

U.S. PATENT DOCUMENTS

| | | | |
|---|---|---|---|
| 7,017,114 B2 * | 3/2006 | Guo | G06F 17/27 |
| | | | 707/999.001 |
| 7,324,988 B2 * | 1/2008 | Altevogt | G06F 17/30619 |
| 7,536,408 B2 * | 5/2009 | Patterson | G06F 17/30616 |
| 7,634,465 B2 * | 12/2009 | Sareen | G06T 3/4038 |
| 8,015,188 B2 * | 9/2011 | Gallivan | G06F 3/0641 |
| | | | 707/738 |
| 8,122,043 B2 | 2/2012 | Buckley et al. | |
| 8,171,052 B2 * | 5/2012 | Takuma | G06F 17/30684 |
| | | | 707/786 |
| 2005/0165750 A1 * | 7/2005 | Shakib | G06F 17/30613 |
| 2005/0222998 A1 * | 10/2005 | Driessen | G06F 17/2755 |
| 2006/0200442 A1 * | 9/2006 | Parikh | G06F 16/9024 |
| 2009/0254523 A1 * | 10/2009 | Lang | G06F 17/30619 |
| 2010/0094877 A1 * | 4/2010 | Garbe | G06F 17/301 |
| | | | 707/742 |
| 2011/0040761 A1 | 2/2011 | Flatland et al. | |
| 2013/0218934 A1 | 8/2013 | Lin et al. | |
| 2013/0318069 A1 | 11/2013 | Aluc et al. | |
| 2013/0346424 A1 * | 12/2013 | Zhang | G06F 17/30616 |
| | | | 707/750 |

FOREIGN PATENT DOCUMENTS

| | | |
|---|---|---|
| CN | 101271457 A | 9/2008 |
| CN | 103020299 A | 4/2013 |

OTHER PUBLICATIONS

The World Intellectual Property Organization (WIPO) International Search Report for PCT/CN2014/090370 dated Jan. 28, 2015.

\* cited by examiner

METHOD AND APPARATUS FOR GENERATING SEARCH RESULTS USING INVERTED INDEX

CROSS-REFERENCES TO RELATED APPLICATIONS

This application is a continuation of PCT Patent Application No. PCT/CN2014/090370, filed on Nov. 5, 2014, which claims priority to Chinese Patent Application No. 201310631836.7, filed on Nov. 29, 2013, the entire contents of all of which are incorporated herein by reference.

TECHNICAL FIELD

The disclosure relates to the field of search technology.

BACKGROUND

With the rapid growing of Internet technologies, the amount of information on the internet represents an explosive growth every day. Search engine may help a user to quickly acquire desired information among massive data by constructing an effective data index. In the technology of search engines, inverted index is a kind of data structure being widely used for storing mappings of a storage location for a term in a document or a set of documents in the context of full-text searching. Through the use of inverted index, a document list containing a keyword can be quickly acquired to generate a search result to the user.

In conventional search engines, terms for which inverted indexes are formed and document lists corresponding to the terms are generally stored in a single computing device. Because of the limited hardware resource of the single computing device, the more the terms being inverted indexed, the larger the storage space occupied by the generated inverted indexed data. Meanwhile, during the retrieving process, the frequency of read and write operations on magnetic disks will be higher. Taking 200 million pieces of documents as an example, the number of the terms being inverted indexed is more than 1.4 billion, and the amount of inverted index data corresponding to these terms is more than 560 GB. Thus, during the retrieving process, the burdens on the Central Processing Unit and the magnetic disks are too heavy to perform an efficient computation, which would impact the access speed for the inverted index data and results in a low efficiency in generating the search result.

BRIEF SUMMARY OF THE DISCLOSURE

According to an embodiment of the disclosure, a method for search is provided. The method may include: performing term segmentation for grabbed documents to count a term frequency of each term, the term frequency of the term representing a number of the grabbed documents containing the term; and generating a high frequency term inverted index and a low frequency term inverted index respectively. The high frequency term inverted index contains terms having a term frequency higher than a predefined threshold, and the low frequency term inverted index contains terms having a term frequency not higher than the predefined threshold. The method may further include loading the high frequency term inverted index and the low frequency term inverted index respectively to different retrieval modules, the different retrieval modules respectively corresponding to mutually independent storage devices.

Another embodiment of the disclosure provides an apparatus for search, including: a term segmentation unit, an inverted index generation unit, and an inverted index loading unit. The term segmentation unit may be configured to perform term segmentation for grabbed documents to count a term frequency of each term, the term frequency of the term representing a number of the grabbed documents containing the term. The inverted index generation unit may be configured to generate a high frequency term inverted index and a low frequency term inverted index respectively. The high frequency term inverted index contains terms having a term frequency higher than a predefined threshold, and the low frequency term inverted index contains terms having a term frequency not higher than the predefined threshold. The inverted index loading unit may be configured to load the high frequency term inverted index and the low frequency term inverted index respectively to different retrieval modules, the different retrieval modules respectively corresponding to mutually independent storage devices.

According to embodiments of the disclosure, differences between high and low frequency term inverted indexes in data access are taken into consideration. High frequency terms and low frequency terms are separated and the inverted indexes for the two kinds of terms are stored in separated devices respectively. Compared to the solution of mixing the inverted indexes of high and low frequency terms together to store into a single device, solutions of the present disclosure lower memory occupancy and reduce read and/or write operations on magnetic disks when reading inverted index data, and thus greatly improve the efficiency of search.

DESCRIPTION OF THE DRAWINGS

FIG. 8 illustrates an exemplary operating environment incorporating certain disclosed embodiments; and.

DETAILED DESCRIPTION OF EMBODIMENTS

In order to make the objects, technical solutions and advantages of the disclosure more apparent, the disclosure will be further illustrated in detail with reference to the accompanying drawings and embodiments. It is to be noted that the embodiments described herein are only illustrative instead of limiting.

According to embodiments of the disclosure, differences between high and low frequency term inverted indexes in data access are taken into consideration. High frequency terms and low frequency terms are separated and the inverted indexes for the two kinds of terms are stored in separated devices respectively. Compared to the solution of mixing the inverted indexes of high and low frequency terms together to store into a single device, solutions of the present disclosure lower memory occupancy and reduce read and write operations on magnetic disks when reading inverted index data, and thus greatly improve the efficiency of search.

It is to be noted that methods and apparatuses for search according to the embodiments of the present disclosure will be described below in detail by taking webpage search as an example. Apparently, based on the same implementation principle, the embodiments of the present disclosure may also be applied to other search-related products, such as retrieving tools for bibliographic database, library searching system, and the like.

Figure 1:
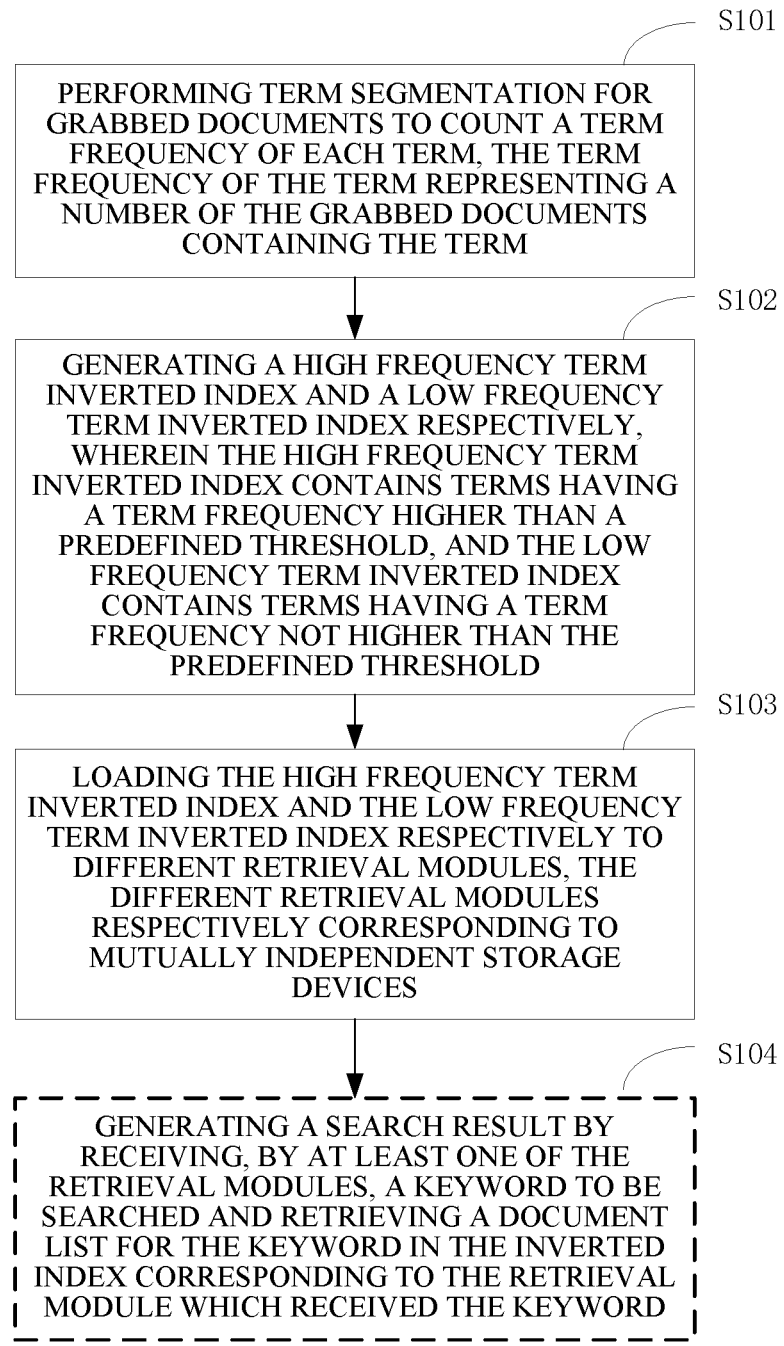
FIG. 1 is a flow diagram of a method for search according to an embodiment of the disclosure.

FIG. 1 is an exemplary flow diagram of a method for search according to an embodiment of the disclosure.

Step S101: performing term segmentation for grabbed documents to count a term frequency of each term, the term frequency of the term representing a number of the grabbed documents containing the term.

In terms of webpage search, the grabbed documents are obtained by a search engine following particular rules, tracing webpage links on the Internet, crawling from one webpage to another, and grabbing the webpage data acquired during the crawling process. Different documents are grabbed depending upon search services provided by search engines. For example, regarding a vertical search, the grabbed documents only include webpage data of a particular search field on which the vertical search focuses or webpage data meeting a particular search requirement; while regarding a website search within a portal website, the grabbed documents only include webpage data within this portal website.

After storing the grabbed documents into an original page database, term segmentation may be performed for the grabbed documents. Through optional steps such as term extraction, Chinese or English term segmentation, stopword subtraction, noise elimination, etc., a forward index of terms per each grabbed document is first developed. The data structure of the forward index may be <docid, termid>, where docid identifies a piece of document and termid indicates one term in this piece of document. The termid may be a 64-bit unsigned integer developed by performing the Message Digest Algorithm 5 (MD5) computation on the term, and the termid of each term is unique in a global system.

After the forward index of terms per each grabbed document has been developed, a term frequency counting may be performed for each term through programming models such as MapReduce, etc. such that these terms may be divided into high frequency terms and low frequency terms. In embodiments of the disclosure, the term frequency of a term represents the amount of documents containing this term among the grabbed documents. For example, among 10,000 pieces of grabbed documents, if the amount of documents in which a term "recruiting" appears is 1,000, then the term frequency of the term "recruiting" is 1,000. A term with a counted term frequency higher than a predefined threshold may be classified as high frequency term; and a term with a counted term frequency lower than the predefined threshold may be classified as low frequency term. In this embodiment, the predefined threshold may be set depending on the total amount of the grabbed documents. For example, if the total amount of the grabbed documents is 10000, the predefined threshold may be set at e.g. 100, and when the total amount of the grabbed documents is doubled, then the predefined threshold should be set higher than 100. The detailed setting manner may be determined depending on actual situation of the grabbed documents, and is not limited herein.

Step S102: generating a high frequency term inverted index and a low frequency term inverted index respectively, wherein the high frequency term inverted index contains terms having a term frequency higher than a predefined threshold, and the low frequency term inverted index contains terms having a term frequency not higher than the predefined threshold.

Depending on term frequencies of terms, data accesses for inverted indexes of the terms may have different features as follows.

High frequency terms occupy only a small part of the entire terms, and may be less than 1% of the entire terms. Thus, when reading document lists of high frequency terms, the read and/or write times for magnetic disks may be small. On the other hand, a high frequency term may appear in many web pages because of its high term frequency. Thus each high frequency term may correspond to a document list having a relatively large data size, which usually may be several MB or even more than 100 MB.

Low frequency terms occupy a large part of the entire terms, and over 99% of the entire terms may be low frequency terms. Thus, when reading document lists of low frequency terms, the read and/or write times for magnetic disks may be enormous. However, a low frequency term has a lower term frequency, and each low frequency term may correspond to a document list usually having a data size of several Bytes or dozens of Bytes.

Based on the different features above of data access for inverted indexes of high frequency terms and low frequency terms, at step S102, a high frequency term inverted index and a low frequency term inverted index are generated respectively in accordance with the forward indexes of the terms and high and low frequency term lists obtained at S101. Separating high frequency terms and low frequency terms and generating respective inverted indexes facilitates storing these kinds of inverted indexes into separated devices in the subsequent operations.

Step S103: loading the high frequency term inverted index and the low frequency term inverted index respectively to different retrieval modules, the different retrieval modules respectively corresponding to mutually independent storage devices.

The high frequency term inverted index and the low frequency term inverted index respectively generated at step S102 are loaded into different retrieval modules at step S103, wherein the retrieval modules have independent storage devices. A retrieval module may be a server, and may also be constructed from multiple servers. The retrieval module for loading the high frequency term inverted index and the retrieval module for loading the low frequency term inverted index should be mutually independent. The two kinds of retrieval modules have mutually independent storage devices respectively so that when generating search results, the data access operation for the high frequency term inverted index and the data access operation for the low frequency term inverted index are mutually independent.

In the embodiment, the storage device may include memories (e.g., volatile memory or memory with faster access speed) and magnetic disks (or other types of nonvolatile memory such as a flash memory). In an embodiment, for an inverted index loaded into a retrieval module, the document list for the term may be stored in the magnetic disk to ensure sufficient data storage space for the document list, and the storage location in the magnetic disk of the document list corresponding to the term may be stored in the memory together with the term, making use of the faster access speed of the memory as a semiconductor device when searching an inverted index for a requested term.

Figure 2:
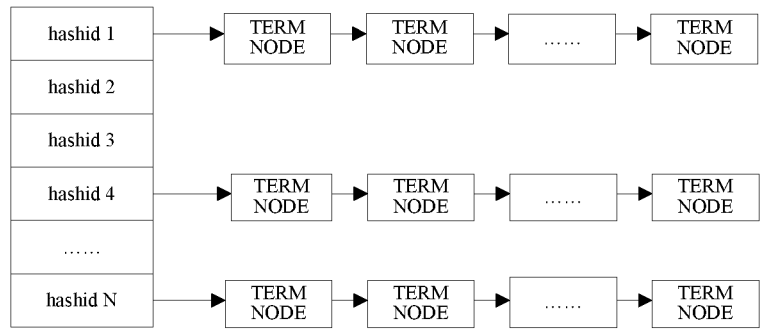
FIG. 2 is a schematic diagram of a storage structure of an inverted index according to an embodiment of the disclosure.

In an embodiment, the document list for the term may be stored in the magnetic disk in a B+ tree. In an embodiment, a hash bucket may be used in the memory to store the term and the storage location in the magnetic disk of the document list for the term. As shown in FIG. 2, each node in the hash bucket corresponds to a term. The corresponding term is represented by hashid in the hash bucket. The document list corresponding to each term is stored in the corresponding Term node within the magnetic disk. The hashid for each term may be computed by:

hashid=hash_func (termid, hashnum), where hash_func is a hash function. Various algorithms may be applied for hash functions and will not be limited in the disclosure; termid is a 64-bit unsigned integer developed by performing the MD5 computation on the term; and hashnum is the number of the current hash buckets.

After the storage location of the document list for the term in the magnetic disk is acquired, index information such as the termid of the term and the storage location are stored in a hash node corresponding to the term. When reading the inverted index data, the storage location of the document list for the term in the magnetic disk may be obtained by determining the hash node corresponding to the term based on the hashid of the term in the hash bucket and extracting the index information of the term from the hash node. Then by reading and/or writing of the magnetic disk, the document list for the term may be extracted from the corresponding storage location.

The method according to the embodiment may contain an optional step S104 of generating a search result by receiving, by at least one of the retrieval modules, a keyword in a search phrase and retrieving a document list for the keyword in the inverted index corresponding to the retrieval module which received the keyword.

After loading the high frequency term inverted index and the low frequency term inverted index respectively to different retrieval modules, through some general data processing operations such as link relationship computing, special file processing, etc., the search engine finishes the pre-processing for the grabbed documents. Subsequently, when a user inputs a keyword into a search box, the keyword may be received by at least one of the above retrieval modules, and searched for in the inverted index loaded to this retrieval module, to generate a search result.

As an exemplary implementation of S104, the keyword may be received, in parallel, by the retrieval module where the high frequency term inverted index is loaded and the retrieval module where the low frequency term inverted index is loaded. Search is performed concurrently in the high frequency term inverted index and the low frequency term inverted index. The retrieved document list for the keyword may be outputted as a search result.

Figure 3:
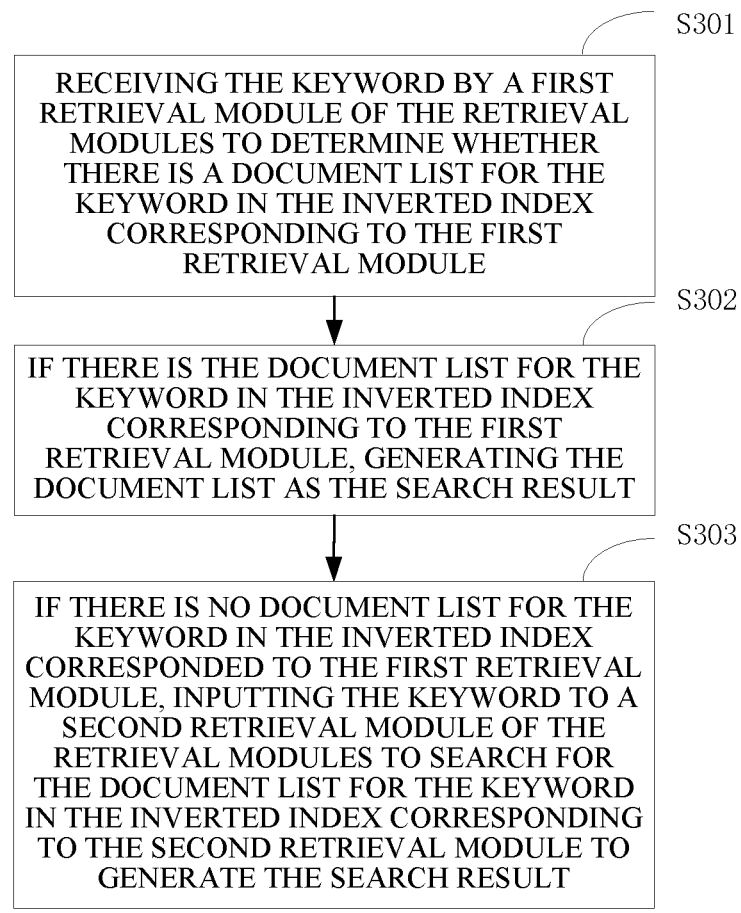
FIG. 3 is an exemplary flow diagram of step S104 in a method for search according to an embodiment of the disclosure.

As another exemplary implementation of S104, the keyword may be received by one of the above retrieval modules first. If a document list for the keyword is retrieved, a search result may be outputted; otherwise, the keyword may be further inputted to another retrieval module for search. FIG. 3 shows an exemplary implementation of S104 which may include the following operations.

Step S301: receiving the keyword by a first retrieval module of the retrieval modules to determine whether there is a document list for the keyword in the inverted index corresponding to the first retrieval module.

Step S302: if there is the document list for the keyword in the inverted index corresponding to the first retrieval module, generating the document list as the search result.

Step S303: if there is no document list for the keyword in the inverted index corresponding to the first retrieval module, inputting the keyword to a second retrieval module of the retrieval modules to search for the document list for the keyword in the inverted index corresponding to the second retrieval module to generate the search result.

In the embodiment, when a document list for the keyword has been retrieved in any of the inverted indexes, the document list may be generated as the search result. In practical, it is possible to rank the documents within the retrieved document list, and sort the documents in an order of the relevance between the documents and the keyword before outputting the final search result.

In the embodiment shown in FIG. 3, the first retrieval module may include the retrieval module where the low frequency term inverted index is loaded, and the second retrieval module may include the retrieval module where the high frequency term inverted index is loaded. That is, the document list for the keyword may be searched for in the low frequency term inverted index first; if the document list for the keyword is retrieved, then outputting the search result, and otherwise the document list for the keyword is searched for in the high frequency term inverted index. On one hand, as most terms are low frequency terms, in comparison with first searching for document list for the keyword in the high frequency term inverted index, searching for the document list first for the keyword in the low frequency term inverted index may have a higher probability of obtaining the document list. On the other hand, as the data access speed of memory is much higher than that of magnetic disk, by first searching for the document list for the keyword in the low frequency term inverted index, though the relatively large amount of the low frequency terms results in accessing memory for more times during the retrieval process, the data size of the acquired document list is very small. In view of the two aspects, by first searching for the document list for the keyword in the low frequency term inverted index, it is possible to accelerate the search in the inverted indexes and accordingly improve the efficiency of search.

Meanwhile, under a circumstance that a search condition or a search phrase includes multiple keywords to search, if for example the search engine uploads 250 search requests per second, a conventional retrieval module, where inverted indexes of high frequency terms and inverted indexes of low frequency terms are stored together, needs to perform 2000 times of disk accesses per second, and a disk glitch rate is 0.01%. Here a disk glitch involves a sudden time increasing when accessing the disk: generally, the time cost of each disk access may be less than 3 ms; if however the disk is under a heavy burden, sometimes the time cost may be of hundreds of microseconds, and this is referred to as a glitch. The disk glitch rate refers to the probability of a glitch during reading or writing the disk. In the technical solution according to embodiments of the disclosure, where the document list for the keyword is first searched for in the low frequency term inverted index and then searched for in the high frequency term inverted index, most of the low frequency terms have be separated apart, and thus the retrieval module where the high frequency term inverted index is loaded only needs 250 times of disk accesses per second, with almost zero disk glitch rate. Meanwhile, the disk glitch rate for the retrieval module where the low frequency term inverted index is loaded is lower than 0.0001%. It is thus apparent that the solution provided by the disclosure greatly improves the data access efficiency for the inverted indexes.

In the embodiment, if no document list corresponding to the keyword is retrieved through the search operations in the two retrieval modules, an empty search result is outputted, and in other words, no document related to the keyword is retrieved.

Figure 4:
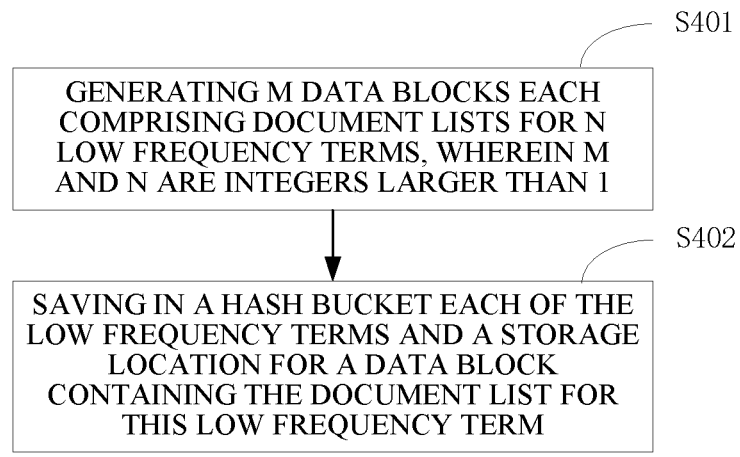
FIG. 4 is an exemplary flow diagram of step S103 in a method for search according to an embodiment of the disclosure.

If same manner is employed for storing inverted indexes for both low frequency terms and high frequency terms, as the number of the low frequency terms is on a billion level, too large memory space may be occupied. FIG. 4 shows an exemplary implementation of step S103 in a method for search according to another embodiment of the disclosure.

According to the embodiment, step S103 includes loading the high frequency term inverted index into a first retrieval module, and loading the low frequency term inverted index into a second retrieval module, and loading the low frequency term inverted index into the second retrieval module may include, as shown in FIG. 4: step S401 of generating M data blocks each comprising document lists for N low frequency terms, wherein M and N are integers larger than 1; and step S402 of saving in a hash bucket each of the low frequency terms and a storage location for a data block containing the document list for this low frequency term.

That is, the document lists of multiple low frequency terms are packed into a data block in the magnetic disk for the second retrieval module, and the storage location of this data block in the disk is acquired. A hash bucket is still employed in the memory for the second retrieval module to save the index information. Compared with the implementation shown in FIG. 2, each node of the hash bucket according to the present embodiment corresponds to a data block. Specifically, in each node of the hash bucket, the storage location of a data block in the disk is stored, and all the low frequency terms which share this data block for storing their document lists are also stored. Further, the low frequency terms that share the data block for storing their document lists share a common hashid.

Figure 5:
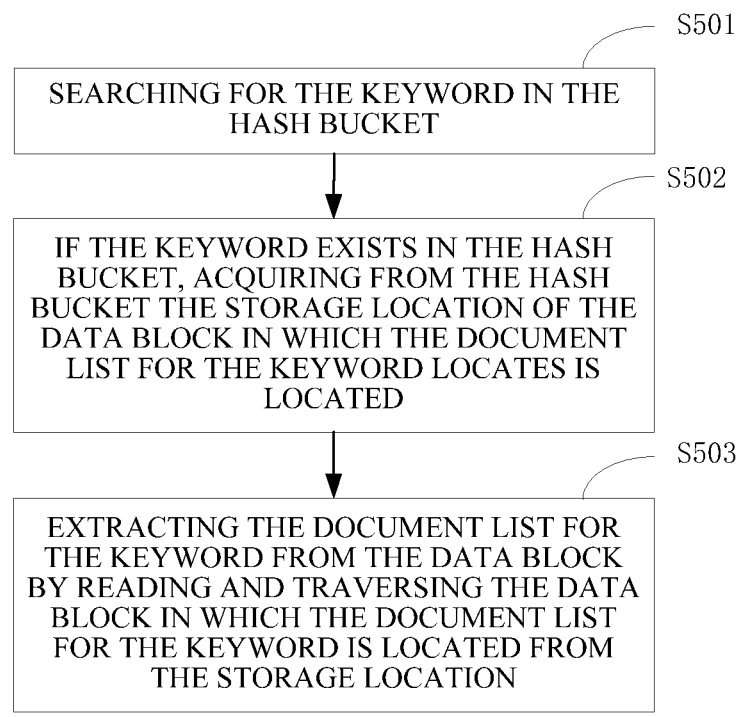
FIG. 5 is an exemplary flow diagram of step S103 in a method for search according to another embodiment of the disclosure.

Based on the above solution for storing low frequency term inverted index, when the retrieval module that received the keyword in step S104 is the second retrieval module, an implementation of retrieving a document list for the keyword in the inverted index corresponding to the retrieval module is shown in FIG. 5.

Step S501: searching for the keyword in the hash bucket.

Specifically, it is possible to compute a hashid of the keyword based on the hash function to determine whether a hash node represented by the computed hashid exists in the hash bucket.

Step S502: if the keyword exists in the hash bucket, acquiring from the hash bucket the storage location of the data block in which the document list for the keyword is located.

When it is found that a hash node represented by the computed hashid exists in the hash bucket, the hash node is found based on the hashid and the storage location of the data block saved by the hash node is extracted.

Step S503: extracting the document list for the keyword from the data block by reading and traversing the data block in which the document list for the keyword is located from the storage location.

The space of the second retrieval module occupied in the memory can be greatly reduced by applying the solution for storing low frequency term inverted index as shown in FIG. 4. Taking the above 200 million pieces of documents as an example, the inverted indexes of the 5 million high frequency terms, whose data amount is about 500 GB, can be stored in 10 machines, and the remaining inverted indexes of the 1.4 billion low frequency terms, whose data amount is about 60 GB, can be stored in only one machine. In contrast, with the conventional solution, where inverted indexes of high and low frequency terms are stored together, it has to cost 34 machines to store all the 200 million documents and their inverted indexes, as one machine can only store 6 million documents and their inverted indexes. Thus, the storage solution of the present disclosure greatly reduces the hardware cost for a search engine.

Figure 6:
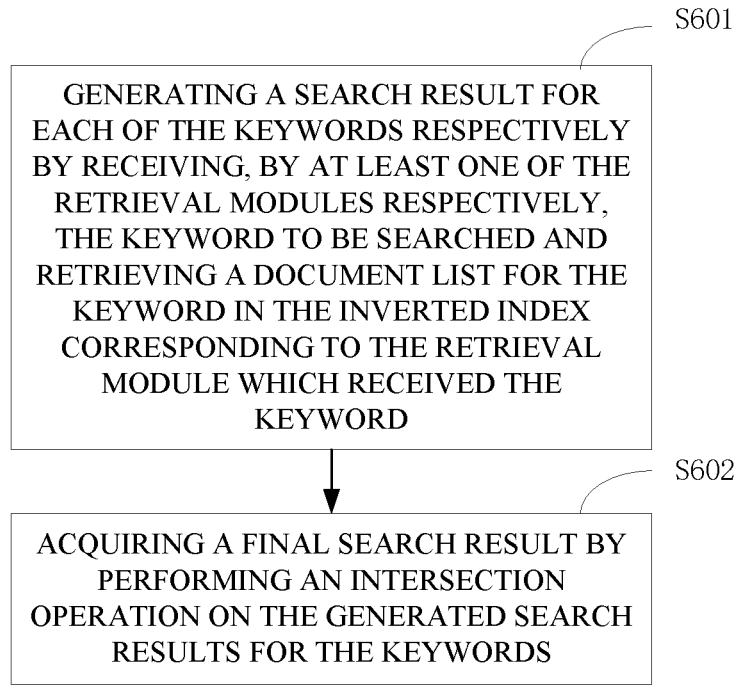
FIG. 6 is an exemplary flow diagram of step S104 in a method for search according to another embodiment of the disclosure.

In actual searching examples, a situation may occur that a user may input in a search box a search phrase having more than one keywords in one time. For this case, an intersection operation may be performed on the search results for the keywords to generate a final search result, and FIG. 6 shows an exemplary implementation of step S104 including the following steps.

Step S601: generating a search result for each of the keywords respectively by receiving, by at least one of the retrieval modules respectively, the keyword to be searched and retrieving a document list for the keyword in the inverted index corresponding to the retrieval module which received the keyword.

Step S602: acquiring a final search result by performing an intersection operation on the generated search results for the keywords.

For example, the keywords inputted into the search box includes A and B. By executing step S601, the user may obtain a document list related to keyword A which contains 1000 pieces of documents, and another document list related to keyword B which contains 4000 pieces of documents. Then at step S602, an intersection operation may be performed on the two document lists to obtain the documents common in the two document lists. Optional operations such as ranking by relevance, sorting, etc. may be perform on these documents to output the final search result with respect to keywords A and B.

As an alternative implementation of the embodiment shown in FIG. 6, instead of receiving multiple keywords sequentially by the retrieval module, a term list containing the multiple keywords may be received by the retrieval module at one time. During the search process in the retrieval module, searches may be performed on the keywords in the term list one by one to obtain search results for the keywords in order. In addition, in the embodiment, if the term list is sequentially received by the two retrieval modules sequentially, the document list for the keyword retrieved by the first retrieval module may be inputted to the second retrieval module. When the second retrieval module searches for a keyword in the term list, it may first be determined whether the inputted data contains the document list for the keyword being currently searched for; if so, it is determined that the document list for this keyword has been retrieved by the first retrieval module. The second retrieval module then skips the search for the keyword and proceeds with the process of the next keyword in the term list.

According to the embodiment of the disclosure, differences between high and low frequency term inverted indexes in data access are taken into consideration. High frequency terms and low frequency terms are separated and the inverted indexes for the two kinds of terms are stored in separated devices respectively. Compared to the solution of mixing the inverted indexes of high and low frequency terms together to store into a single device, solutions of the present disclosure lower memory occupancy and reduce read and write operations on magnetic disks when reading inverted index data, and thus greatly improve the efficiency of search.

Figure 7:
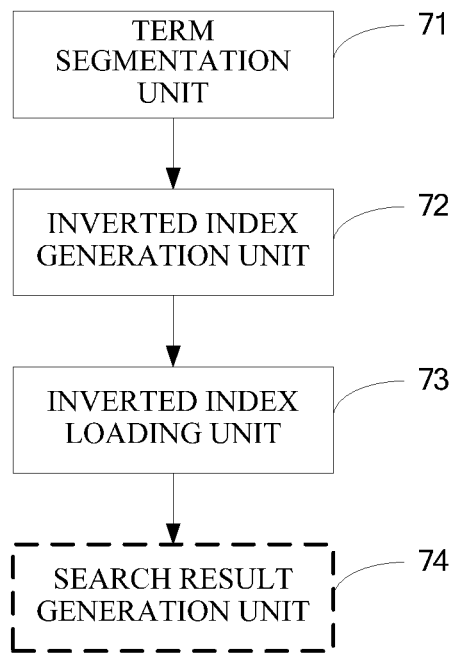
FIG. 7 is a structural diagram of an apparatus for search according to an embodiment of the disclosure.

FIG. 7 is a structural diagram of an apparatus for search according to an embodiment of the disclosure. The apparatus may operate to run the methods for search according to the embodiments shown in FIGS. 1-6. For the purpose of clarity, only the parts related to the present embodiment are shown.

Referring to FIG. 7, the apparatus includes a term segmentation unit 71, an inverted index generation unit 72, and an inverted index loading unit 73.

The term segmentation unit 71 is configured to perform term segmentation for grabbed documents to count a term frequency of each term, the term frequency of the term representing a number of the grabbed documents containing the term.

The inverted index generation unit 72 is configured to generate a high frequency term inverted index and a low frequency term inverted index respectively, wherein the high frequency term inverted index contains terms having a term frequency higher than a predefined threshold, and the low frequency term inverted index contains terms having a term frequency not higher than the predefined threshold.

The inverted index loading unit 73 is configured to load the high frequency term inverted index and the low frequency term inverted index respectively to different retrieval modules, the different retrieval modules respectively corresponding to mutually independent storage devices.

Optionally, the apparatus may further a search result generation unit 74 configured to generate a search result by receiving, by at least one of the retrieval modules, a keyword to be searched and retrieving a document list for the keyword in the inverted index corresponding to the retrieval module which received the keyword.

Optionally, the search result generation unit 74 may include:

a determination subunit configured to input the keyword to a first retrieval module of the retrieval modules to determine whether there is a document list for the keyword in the inverted index corresponding to the first retrieval module;

a first generation subunit configured to generate the document list as the search result if there is the document list for the keyword in the inverted index corresponding to the first retrieval module; and a second generation subunit configured to input the keyword to a second retrieval module of the retrieval modules to search for the document list for the keyword in the inverted index corresponding to the second retrieval module to generate the search result if there is no document list for the keyword in the inverted index corresponding to the first retrieval module.

Optionally, the first retrieval module comprises a retrieval module loaded with the low frequency term inverted index, and the second retrieval module comprises a retrieval module loaded with the high frequency term inverted index.

Optionally, the inverted index loading unit 73 is further configured load the high frequency term inverted index into a first retrieval module, and load the low frequency term inverted index into a second retrieval module, and the inverted index loading unit may further comprise: a data block generation subunit configured to generate M data blocks each comprising document lists for N low frequency terms, wherein M and N are integers larger than 1; and a saving subunit configured to save in a hash bucket each of the low frequency terms and a storage location for a data block containing the document list for this low frequency term.

Alternatively, the search result generation unit 74 may further include: a searching subunit configured to search for the keyword in the hash bucket if the retrieval module which received the keyword is the second retrieval module; an acquisition subunit configured to acquire from the hash bucket the storage location of the data block in which the document list for the keyword is located, if the keyword exists in the hash bucket; and an extraction subunit configured to extract the document list for the keyword from the data block by reading and traversing the data block in which the document list for the keyword is located from the storage location.

Alternatively, the search result generation unit 74 may further include a third generation subunit configured to generating, when the search phrase comprises more than one keywords, a search result for each of the keywords respectively by inputting the keyword to be searched into at least one of the retrieval modules respectively and retrieving a document list for the keyword in the inverted index corresponding to the retrieval module to which the keyword was inputted; and an intersection subunit configured to acquire a final search result by performing an intersection operation on the generated search results for the keywords.

Figure 8:
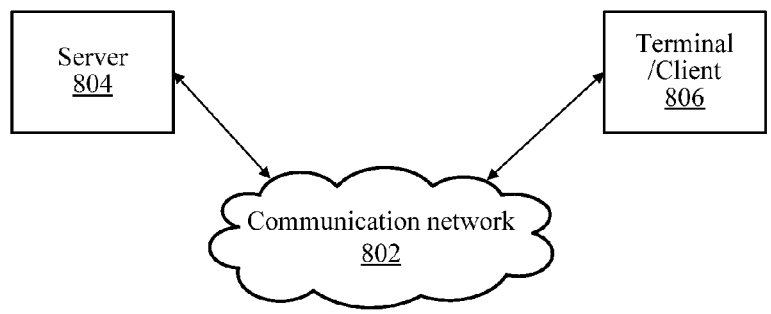

FIG. 8 depicts an exemplary environment 800 incorporating the exemplary methods and mobile terminals in accordance with various disclosed embodiments. As shown in FIG. 8, the environment 800 can include a server 804, a terminal 806, and a communication network 802. The server 804 and the terminal 806 may be coupled through the communication network 802 for information exchange, e.g., information searching, etc. Although only one terminal 806 and one server 804 are shown in the environment 800, any number of terminals 806 or servers 804 may be included, and other devices may also be included.

The communication network 802 may include any appropriate type of communication network for providing network connections to the server 804 and terminal 806 or among multiple servers 804 or terminals 806. For example, the communication network 802 may include the Internet or other types of computer networks or telecommunication networks, either wired or wireless. Servers 804 may host a search engine and respond to search requests from terminals 806. Further, servers 804 and/or terminals 806 may implement the disclosed method for search, such as grabbing documents from online resources (e.g., by web crawling) and/or offline resources (e.g., from local storage or portable storage medium), segmenting terms from the grabbed documents, counting term frequency, generating high frequency term inverted index and low frequency term inverted index, generating search results, etc. Servers 804 may further host two retrieval modules to load high frequency term inverted index and the low frequency term inverted index respectively. In some embodiments, a first set of one or more servers 804 may host the first retrieval module, and a second set of one or more servers 804 may host the second retrieval module.

A terminal, as used herein, may refer to any appropriate user terminal with certain computing capabilities, e.g., a personal computer (PC), a work station computer, a hand-held computing device (e.g., a tablet), a mobile terminal (e.g., a mobile phone or a smart phone), or any other user-side computing device.

A server, as used herein, may refer to one or more server computers configured to provide certain server functionalities, e.g., data retrieval, data storage and database management. A server may also include one or more processors to execute computer programs in parallel.

For example, a user may operate a terminal 806 through a command or a user interface (e.g., a browser) to input a search phrase and request a server 804 for related pages. The server 804 may generate search results by retrieving related document list from at least one retrieval modules and return the search results to the terminal 806. The terminal 806 may display the search results though the user interface.

Figure 9:
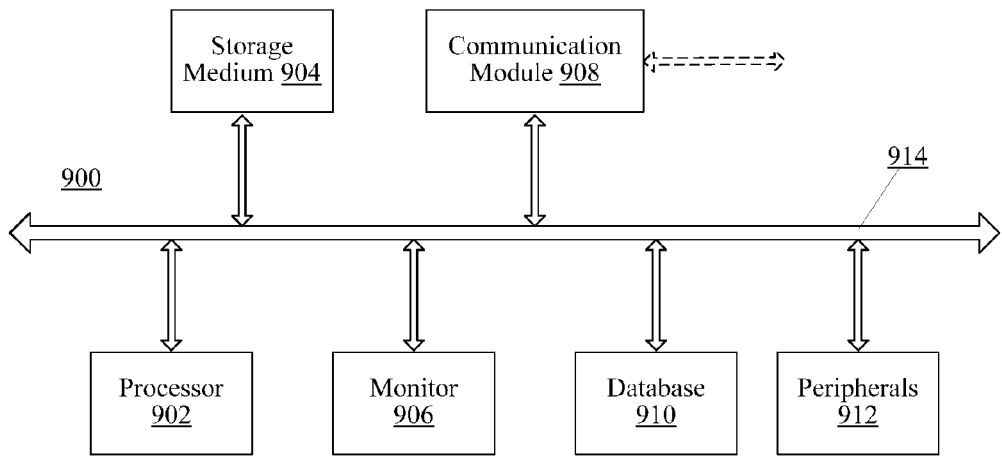
FIG. 9 illustrates a block diagram of an exemplary computer system consistent with the disclosed embodiments.

The server 804 and the terminal 806 may be implemented on any appropriate computing platform. FIG. 9 shows a block diagram of an exemplary computing system 900 capable of implementing the server 804 and/or the terminal 806. As shown in FIG. 9, the exemplary computer system 900 may include a processor 902, a storage medium 904, a monitor 906, a communication module 908, a database 910, peripherals 912, and one or more bus 914 to couple the devices together. Certain devices may be omitted and other devices may be included.

The processor 902 can include any appropriate processor or processors. Further, the processor 902 can include multiple cores for multi-thread or parallel processing. The storage medium 904 may include memory modules, e.g., Read-Only Memory (ROM), Random Access Memory (RAM), and flash memory modules, and mass storages, e.g., CD-ROM, U-disk, removable hard disk, etc. The storage medium 904 may store computer programs for implementing various processes (e.g., obtaining user input, storing term inverted index and document lists corresponding to the terms, retrieving document list according to the term inverted index, generating search result, etc.), when executed by the processor 902.

The monitor 906 may include display devices for displaying contents in the computing system 900, e.g., displaying a search result in a window of a browser. The peripherals 912 may include I/O devices, e.g., keyboard and mouse for inputting information by a user.

Further, the communication module 908 may include network devices for establishing connections through the communication network 802. The database 910 may include one or more databases for storing certain data (e.g., grabbed documents, inverted index, terms and corresponding document lists) and for performing certain operations on the stored data.

In operation, the server 804 may implement the disclosed search method. The server 804 may be configured to provide structures and functions correspondingly for related actions and operations.

As disclosed herein, the disclosed methods and apparatus may be accomplished by other means. The apparatus as depicted above in accordance with various embodiments are exemplary only. For example, the disclosed modules/units can be divided based on logic functions. In actual implementation, other dividing methods can be used. For instance, multiple modules or units can be combined or integrated into another system, or some characteristics can be omitted or not executed, etc.

In various embodiments, the disclosed modules for the exemplary system as depicted above can be configured in one device or configured in multiple devices as desired. The modules disclosed herein can be integrated in one module or in multiple modules for processing messages. Each of the modules disclosed herein can be divided into one or more sub-modules, which can be recombined in any manners.

In addition, each functional module/unit in various disclosed embodiments can be integrated in a processing unit, or each module/unit can exist separately and physically, or two or more modules/units can be integrated in one unit. The integrated units as disclosed above can be implemented in the form of hardware and/or in the form of software functional unit(s).

When the integrated modules/units as disclosed above are implemented in the form of software functional unit(s) and sold or used as an independent product, the integrated units can be stored in a computer readable storage medium. Therefore, the whole or part of the essential technical scheme of the present disclosure can be reflected in the form of software product(s). The computer software product(s) can be stored in a storage medium, which can include a plurality of instructions to enable a computing device (e.g., a mobile terminal, a personal computer, a server, a network device, etc.) to execute all or part of the steps as disclosed in accordance with various embodiments of the present disclosure. The storage medium can include various media for storing programming codes including, for example, U-disk, portable hard disk, ROM, RAM, magnetic disk, optical disk, etc.

According to embodiments of the disclosure, differences between high and low frequency term inverted indexes in data access are taken into consideration. High frequency terms and low frequency terms are separated and the inverted indexes for the two kinds of terms are stored in separated devices respectively. Compared to the solution of mixing the inverted indexes of high and low frequency terms together to store into a single device, solutions of the present disclosure lower memory occupancy and reduce read and write operations on magnetic disks when reading inverted index data, and thus greatly improve the efficiency of search.

The above described embodiments are merely illustrative instead of limiting. Without departing from the spirit and principle of the present disclosure, any modifications, alternatives and improvements are intended in the scope as defined in the following claims.

What is claimed is:

1. A method for search, comprising:
performing term segmentation for grabbed documents to count a term frequency of each term, the term frequency of the term representing a number of the grabbed documents containing the term, wherein the term segmentation comprises term extraction, Chinese or English term segmentation, stopword subtraction and noise elimination;
developing a forward index of terms for each grabbed document, wherein a data structure of the forward index includes a document identification identifying a piece of document and a term identification indicating a term in the piece of document, and the term identification is a 64-bit unsigned integer developed by performing a Message Digest Algorithm 5 (MD5) computation on the term;
generating a high frequency term inverted index and a low frequency term inverted index respectively, wherein the high frequency term inverted index contains terms having a term frequency higher than a predefined threshold, and the low frequency term inverted index contains terms having a term frequency not higher than the predefined threshold;
loading the high frequency term inverted index into a first retrieval module and loading the low frequency term inverted index into a second retrieval module, the retrieval modules respectively corresponding to mutually independent storage devices; and generating a search result by receiving, by at least one of the retrieval modules, a keyword in a search phrase and retrieving a document list for the keyword in the inverted index corresponding to the retrieval module which received the keyword;

wherein loading the low frequency term inverted index into the second retrieval module further comprises:
  generating M data blocks each comprising document lists for N low frequency terms, wherein M and N are integers larger than 1; and
  saving in a hash bucket each of the low frequency terms and a storage location for a data block containing the document list for this low frequency term;
  if the retrieval module which received the keyword is the second retrieval module, retrieving the document list for the keyword comprising:
    searching for the keyword in the hash bucket;
    if the keyword exists in the hash bucket, acquiring from the hash bucket the storage location of the data block in which the document list for the keyword is located; and
    extracting the document list for the keyword from the data block by reading and traversing the data block in which the document list for the keyword is located from the storage location; and
  wherein the keyword existing in the hash bucket is represented by a hash identity (hashid) and the hash identity is obtained by:
    hashid=hash_func (termid, hashnum), where hash_func is a hash function, termid is the 64-bit unsigned integer developed by performing the MD5 computation on the term, and hashnum is a number of the hash bucket, wherein generating the search result comprises:
  receiving the keyword by a first retrieval module of the retrieval modules to determine whether there is a document list for the keyword in the inverted index corresponding to the first retrieval module;
  if there is the document list for the keyword in the inverted index corresponding to the first retrieval module, generating the document list as the search result; and
  if there is no document list for the keyword in the inverted index corresponding to the first retrieval module, inputting the keyword to a second retrieval module of the retrieval modules to search for the document list for the keyword in the inverted index corresponding to the second retrieval module to generate the search result; and wherein the search phrase comprises a plurality of keywords, and generating the search result comprises:
  generating a search result for each of the keywords respectively by receiving, by at least one of the retrieval modules, the keywords to be searched and retrieving a document list for the keyword in the inverted index corresponding to the retrieval module which received the keywords; and
  acquiring a final search result by performing an intersection operation on the generated search results for the keywords.

2. The method according to claim 1, wherein the first retrieval module comprises a retrieval module loaded with the low frequency term inverted index, and the second retrieval module comprises a retrieval module loaded with the high frequency term inverted index.

3. An apparatus for search, comprising:
a memory storing a plurality of program units; and
a processor coupled to the memory and to execute the plurality of program units, wherein the plurality of program units comprising:
a term segmentation unit to perform term segmentation for grabbed documents to count a term frequency of each term, the term frequency of the term representing a number of the grabbed documents containing the term, wherein the term segmentation comprises term extraction, Chinese or English term segmentation, stopword subtraction and noise elimination, and develop a forward index of terms for each grabbed document, wherein a data structure of the forward index includes a document identification identifying a piece of document and a term identification indicating a term in the piece of document, and the term identification is a 64-bit unsigned integer developed by performing a Message Digest Algorithm 5 (MD5) computation on the term;
an inverted index generation unit to generate a high frequency term inverted index and a low frequency term inverted index respectively, wherein the high frequency term inverted index contains terms having a term frequency higher than a predefined threshold, and the low frequency term inverted index contains terms having a term frequency not higher than the predefined threshold;
an inverted index loading unit to load the high frequency term inverted index into a first retrieval module and load the low frequency term inverted index into a second retrieval module, the different retrieval modules respectively corresponding to mutually independent storage devices; and
a search result generation unit to generate a search result by receiving, by at least one of the retrieval modules, a keyword in a search phrase and retrieving a document list for the keyword in the inverted index corresponding to the retrieval module which received the keyword;
wherein the inverted index loading unit further comprises:
  a data block generation subunit to generate M data blocks each comprising document lists for N low frequency terms, wherein M and N are integers larger than 1; and
  a saving subunit to save in a hash bucket each of the low frequency terms and a storage location for a data block containing the document list for this low frequency term;
wherein the search result generation unit further comprises:
  a searching subunit to search for the keyword in the hash bucket if the retrieval module which received the keyword is the second retrieval module;
  an acquisition subunit to acquire from the hash bucket the storage location of the data block in which the document list for the keyword is located, if the keyword exists in the hash bucket; and
  an extraction subunit to extract the document list for the keyword from the data block by reading and traversing the data block in which the document list for the keyword is located from the storage location; and
wherein the keyword existing in the hash bucket is represented by a hash identity (hashid) and the hash identity is obtained by:

hashid=hash_func (termid, hashnum), where hash_func is a hash function, termid is the 64-bit unsigned integer developed by performing the MD5 computation on the term, and hashnum is a number of the hash bucket, wherein the search result generation unit comprises:

a determination subunit to determine, by receiving the keyword by a first retrieval module of the retrieval modules, whether there is a document list for the keyword in the inverted index corresponding to the first retrieval module;

a first generation subunit to generate the document list as the search result if there is the document list for the keyword in the inverted index corresponding to the first retrieval module; and a second generation subunit to input the keyword to a second retrieval module of the retrieval modules to search for the document list for the keyword in the inverted index corresponding to the second retrieval module to generate the search result if there is no document list for the keyword in the inverted index corresponding to the first retrieval module, and wherein the search result generation unit further comprises:

a third generation subunit to generating, when the search phrase comprises a plurality of keywords, a search result for each of the keywords respectively by inputting the keyword to be searched into at least one of the retrieval modules respectively and retrieving a document list for the keyword in the inverted index corresponding to the retrieval module to which the keyword was inputted; and an intersection subunit to acquire a final search result by performing an intersection operation on the generated search results for the keywords.

4. The apparatus according to claim 3, wherein the first retrieval module comprises a retrieval module loaded with the low frequency term inverted index, and the second retrieval module comprises a retrieval module loaded with the high frequency term inverted index.

* * * * *